Figure 1:
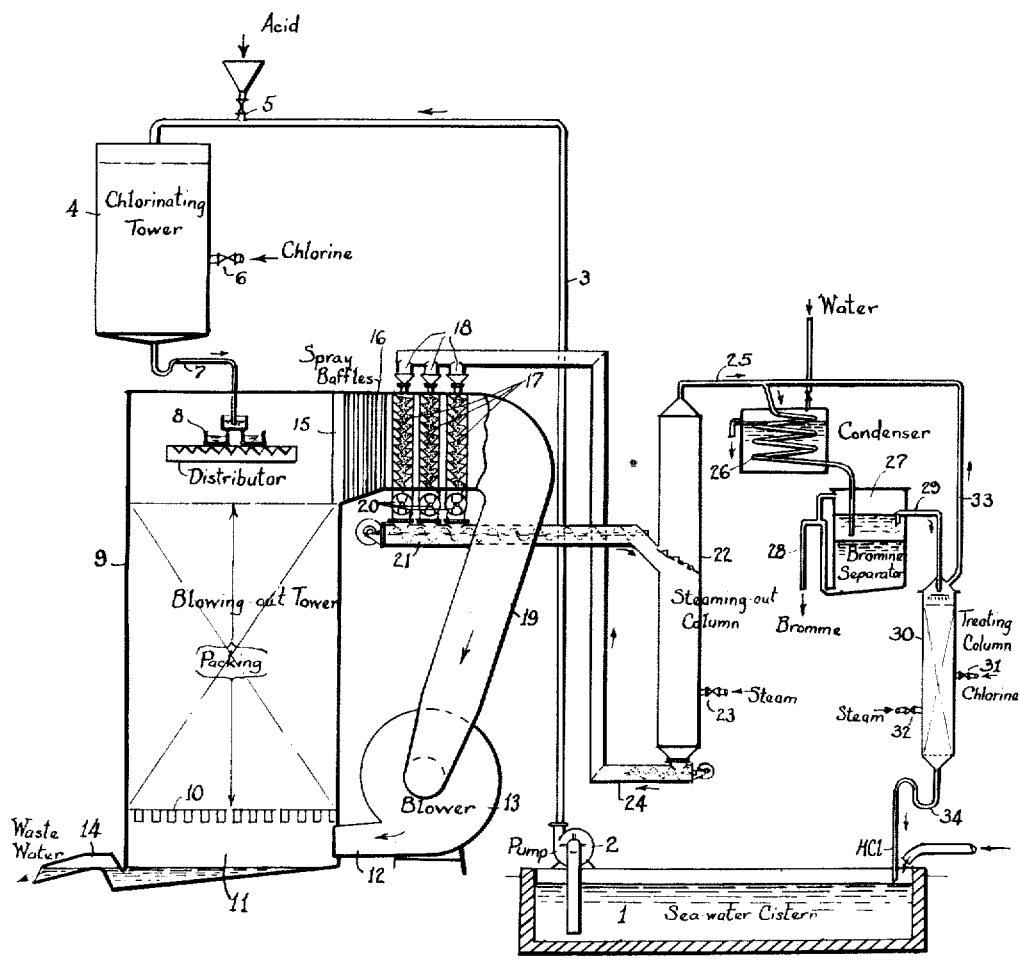

Nov. 1, 1932.    J. J. GREBE ET AL    1,885,255

CONTINUOUS PROCESS FOR RECOVERING BROMINE FROM SEA WATER AND THE LIKE

Filed July 2, 1930

INVENTORS
John J. Grebe and
BY  Ray H. Boundy
Thomas Griswold, Jr.
ATTORNEY

Patented Nov. 1, 1932

1,885,255

UNITED STATES PATENT OFFICE

JOHN J. GREBE AND RAY H. BOUNDY, OF MIDLAND, MICHIGAN, ASSIGNORS TO THE DOW CHEMICAL COMPANY, OF MIDLAND, MICHIGAN, A CORPORATION OF MICHIGAN

CONTINUOUS PROCESS FOR RECOVERING BROMINE FROM SEA WATER AND THE LIKE

Application filed July 2, 1930. Serial No. 465,438.

The present invention is concerned with improvements in methods for extracting bromine from natural waters and other saline solutions, and has particular regard to a continuous process for recovering bromine directly from sea water and obtaining the same as liquid bromine without necessity for preconcentrating said sea water, as by solar evaporation.

We have found that bromine, when liberated from sea water or like solutions of extremely low bromine content by oxidizing the acidified solution with chlorine or by equivalent means, may be removed from the solution by blowing-out with a current of air and that all of the bromine so removed may then be absorbed from the bromine-laden air by passage through a bed or body of active carbon or charcoal. The bromine-saturated charcoal may then be heated or steamed to vaporize and separate the bromine, along with some hydrobromic acid, and such re-liberated bromine may be condensed directly as liquid bromine, while the aqueous distillate may be treated with chlorine equivalent to the hydrobromic acid therein, and the so treated distillate redistilled to recover liquid bromine therefrom. It is among the objects of the invention to provide a continuous, interconnected process of the aforesaid general character whereby liquid bromine may be produced directly from sea water and the like by oxidizing under appropriate conditions without having recourse to any preliminary concentration or to heating the solution, and without employing any step involving absorption of bromine vapors by an alkali. Other objects and advantages will appear as the description proceeds. The invention, then, consists of the steps hereinafter fully described and particularly pointed out in the claims, the following description and accompanying drawing setting forth in detail but a few of the various ways in which the principle of the invention may be used.

Referring to the drawing, the single figure is a diagrammatic representation of an apparatus layout adapted for carrying out the process of the invention. Sea water, or other solution from which bromine is to be extracted, is received in a cistern 1 and is forwarded thence by means of pump 2 and pipe 3 to chlorinating tower 4. An acid inlet 5 is provided for introducing sufficient acid to neutralize the natural alkalinity of the water and impart to it a slight acid reaction. Chlorinator 4 may consist of a column or tower charged with a suitable acid-proof packing, such as ceramic tile, silica, etc. At a point about midway of the tower chlorine is admitted through inlet 6 in regulated amount to displace the bromine from combination in the solution and to liberate the same as free bromine. In the upper section of tower 4 the intermixing of chlorine with the solution takes place, while in the lower section the reaction for the liberation of bromine is completed, the rate of flow of solution over the tower being so adjusted to the height and capacity thereof that all of the bromine will have been liberated when the treated solution leaves the tower through trapped outlet pipe 7. The bromine solution flows through pipe 7 to a distributer 8, here shown as of the weir type, located at the top of blowing-out tower 9 also filled with a suitable packing supported upon grid 10. The solution flows downwardly in distributed manner over the packing in tower 9 against an ascending voluminous current of air introduced into the base 11 of tower 9 by means of duct 12 and blower 13, whereby the bromine may be substantially completely removed or blown out of the solution in the manner well known in the art, such bromine being carried away by the air current. The debrominated effluent flows from the tower base 11 through a waste pipe 14 provided with a liquid seal, e. g. as shown.

The bromine-laden air leaves tower 9 through exit passage 15, in which may be disposed a series of baffle plates 16 for arresting spray carried over from the tower, and passes thence through one or more layers or beds of active charcoal. One convenient arrangement thereof, as illustrated, provides one or more carbon containers or absorbers 17 consisting of a series of vertically spaced inclined plates or louvers. Into each absorber, granular charcoal is charged through a hopper 18, the solid granular material descending by gravity and filling the space between the louvers to a degree governed more or less by the angle of repose of the free flowing material, thereby forming a continuous column of charcoal through which the current of bromine-laden air is drawn in a lateral direction by means of the suction of blower 13 acting through duct 19. When the charcoal becomes saturated with bromine, it is discharged by opening valve 20 into a conveyor 21 which removes the charcoal to the bromine recovery apparatus described below. By employing two or more of the charcoal units continuous operation of the system may be maintained, since, while the charcoal from one such unit is being discharged and the unit refilled, the remaining units continue to function, and no interruption of the flow of the air current is necessitated. Other means of contacting the bromine-laden air current with the adsorbent material, however, may be employed, the one shown in the foregoing description being illustrative of one way of accomplishing the result, but not intended as a limitation upon the invention.

As is evident from the foregoing description, the volume air is continuously recirculated through the system, blowing out the bromine in the tower 9 and being stripped of the bromine vapors in the absorbers 17. Therefore, while complete absorption of bromine vapors may be readily accomplished by properly proportioning the capacity of absorbers to the volume of air flow, any bromine escaping absorption is returned to the system with the recirculated air.

The bromine-saturated charcoal discharged from absorbers 17 is conveyed by conveyor 21 to a steaming out column 22 consisting of a vertical cylindrical chamber, conveyor 21 discharging thereinto at a point below the upper end of the column so that the body of charcoal fills the lower portion thereof leaving a vapor space in the upper portion. Steam is admitted at an inlet 23 and passes upwardly through the body of saturated charcoal, heating the latter and driving off the bromine. The debrominated charcoal is discharged from the base of column 22, a mechanical discharger 24 being shown therefor, and may be returned for reuse in the absorbers 17.

The mixture of bromine and water vapor, containing some hydrobromic acid, leaves column 22 through outlet passage 25 and is conducted to a condenser 26, which may consist of a water-cooled ceramic coil, wherein the vapors are condensed. The liquid condensate flows into a separator 27 wherein two layers are formed, the lower layer consisting of liquid bromine and the upper layer an aqueous solution of bromine and hydrobromic acid. Liquid bromine is withdrawn through draw-off 28 while the aqueous layer overflows through pipe 29 and is conducted to a treating column 30 for the recovery of bromine therefrom. Column 30 contains an acid-proof packing over which the solution flows. At a point about midway of the column chlorine is admitted through inlet 31, while steam is admitted at inlet 32 located at a lower point. The chlorine liberates bromine from the aqueous hydrobromic acid solution, and such bromine together with that already dissolved in the solution is boiled or steamed out, the vapors being returned through pipe 33 to condenser 26. A solution of hydrochloric acid is discharged from column 30 through trapped discharge pipe 34 and flows to cistern 1, wherein it is mixed with the raw sea water and serves to neutralize partially the alkalinity thereof, thus reducing the acid requirements to be added at 5 by an equivalent amount.

When operating the herein described system the sea water, if such be used as the source of bromine, containing about 60 parts bromine per million, is first acidified to establish a sufficient hydrogen ion concentration therein to enable the liberation of all of the bromine. We have found that a degree of acidity represented by a pH value between 6 and 6.5 is necessary in order to liberate all of the bromine in the elemental state, although a greater acidity, e. g. corresponding to a pH value as low as pH=3 or lower, may be employed without other detriment than the extra cost of the acid consumed. For the acidification, a strong mineral acid, e. g. sulphuric, hydrochloric or nitric acid, is preferably employed. The addition of acid may be correlated for purposes of controlling the operation with an indicating instrument to show the hydrogen ion concentration of the acidified mixture, such control being desirably made automatic by means responsive to the hydrogen ion indication.

The sea water, or equivalent solution, having been acidified to a pH value between about 6 and 3, is then treated in chlorinator 4 with sufficient chlorine to liberate all of the bromine therein. A material excess of chlorine is advantageously to be avoided, as such excess accompanies the bromine through the subsequent process steps and must be separated therefrom in order to yield a pure final product. An excess of chlorine may also cause over-oxidation of some of the bromine initially liberated, especially when working with solutions near the upper pH limit, i. e. pH=6, forming thereby soluble bromine compounds which go into solution and thus escape extraction. The last-mentioned condition is more particularly explained in our co-pending application Serial No. 472,027, filed July 31, 1930, in which an electrometric method for controlling the chlorination is described and claimed. In general, however, the amount of chlorine used should not be more than about 30 per cent in excess of that theoretically required to liberate all of the bromine although it is desirable to reduce the excess to a lower figure, when practical, by employing accurate control means for determining directly the degree of chlorination. The chlorinating operation is preferably carried out without heating the water, although heat may be added in this step without departing from the scope of the invention. Instead of treating with chlorine in this step, equivalent means for oxidizing the solution to liberate bromine in the essential state may be employed, such as electrolyzing or treating with other known chemical oxidizing agents.

The removal of free bromine in blowing-out tower 9 is accomplished in the manner old in the art, for instance as originally disclosed in U. S. Patent 460,370 to Herbert H. Dow. For the purpose, a large volume of air at low pressure, e. g. about 2 to 8 inches water column, is employed. By suitably proportioning the flow of acidified and chlorinated solution in the tower to the volume of air and to the height and cross-section of the tower, the bromine may be substantially completely blown out of the solution so that an analysis of the effluent from the base of the tower shows a bromine content as low as 1 to 5 parts per million. The bromine-laden air leaving tower 9 passes first through a spray arrester and is then intimately contacted with a body of active charcoal in any suitable manner, the means therefor previously described having been found especially advantageous for quickness and ease of charging fresh charcoal and discharging saturated charcoal, as well as for exposing a relatively large surface thereof to contact with the air current. A granular form of charcoal of about 10 to 20 mesh size, and having sufficient hardness to withstand mechanical handling without excessive crumbling and dusting, is preferred, such as cocoanut charcoal. Other forms of active carbon or other solid materials capable of adsorbing bromine, such as silica gel or similar metallic oxide gels, may also be used, but in some cases less desirably. We have found that charcoal adsorbs bromine from moist air without adsorbing an appreciable amount of water, whereas silica gel adsorbs water as well as bromine and becomes saturated with a much lower total bromine content than in the case of active charcoal. The charcoal may be used repeatedly and apparently loses nothing in effectiveness for adsorbing bromine, but some mechanical loss thereof occurs due to attrition in handling. It is preferable to separate the dust from the granular mass by screening or by air flotation before charging the same into the absorbers.

When fresh charcoal is employed we have found that a large proportion of the bromine adsorbed, i. e. as much as 20 to 40 per cent., may be converted to hydrobromic acid when the saturated charcoal is steamed out. As the charcoal is used over and over again, however, the proportion of bromine so converted becomes progressively less, and after a few repetitions of use of the charcoal the amount of hydrobromic acid formed in steaming out the bromine therefrom may be reduced to a very small, even almost negligible, figure. It is thought that this behavior is due to the hydrogen originally held occluded by the charcoal due to its method of preparation, and that when such hydrogen has been reacted there is little if any further formation thereof in connection with the operation of the present process. Since the blowing-out and absorption of bromine takes place at about ordinary temperature, varying only with the temperature of the atmosphere and of the water entering the process, there can be little or no catalytic decomposition of moisture to form hydrogen accompanying the aforesaid process steps.

In the steaming-out step the bromine-saturated charcoal, containing about 15 to 30 per cent of its weight of bromine, may be completely separated from the bromine with a steam consumption of about 3 to 4 pounds or less per pound of bromine, using saturated steam at about 5 pounds pressure. Other means of heating the saturated charcoal to remove bromine therefrom may be employed, such as by means of hot air or combustion gases, or by external heating, but the use of steam for the purpose affords obvious advantages.

The liquid bromine condensed and collected in separator 27 contains some chlorine as impurity, the amount of the latter depending upon the control of the chlorination and hence the excess of chlorine used therein. With accurate control the percentage of chlorine in the bromine product should not exceed 1 to 3 per cent. The purification of the liquid bromine may be carried out by any of the well-known methods, such as by treatment with an aqueous bromide solution.

The water layer drawn off from separator 27 is approximately saturated with bromine and also contains whatever hydrobromic acid is formed in the steaming-out step. This solution is treated in column 30 with sufficient chlorine to liberate the bromine from such hydrobromic acid, and the total free bromine therein is simultaneously steamed out and returned to the condenser 26. The addition of chlorine may be controlled by any suitable means, such as already suggested for the initial chlorination of the acidified sea water. The effluent from column 30 is an aqueous hydrochloric acid solution, which is most economically employed for acidifying the raw sea water in cistern 1.

It will be seen, accordingly, that the novel process hereinbefore described in detail operates with a minimum consumption of raw materials and under proper control is capable of recovering substantially all of the bromine contained in sea water in a continuous cycle of steps the product of which is liquid bromine. At only one point in the process is there a possibility of bromine values being lost, that being in the effluent discharged from blowing-out tower 9. It has been found, however, that the total bromine content of such effluent can be held to 5 parts bromine per million or less with economical working which does not demand excessive power consumption for the blowing-out operation. At all other points in the system the gases, solutions or solids from which bromine has been extracted are returned to the process cycle and any bromine values contained therein are retained in the system. The invention, however, is not limited to condensing the bromine vapors, when driven off from the adsorbent material by heating the latter, as liquid bromine, but also comprehends absorbing such vapors in a liquid medium, such as an alkaline solution or an organic solvent, if so desired.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process of recovering bromine which comprises contacting a current of bromine-laden air with a body of active charcoal to adsorb bromine thereon, heating such charcoal with steam to distill the bromine therefrom, condensing the vapors of water and bromine and separating liquid bromine from the aqueous solution thereby obtained.

2. The process of recovering bromine which comprises contacting a current of bromine-laden air with a body of active charcoal to adsorb bromine thereon, heating such charcoal with steam to distill the bromine therefrom, condensing the vapors of water and bromine, separating liquid bromine from the aqueous distillate containing hydrobromic acid, treating the latter with chlorine sufficient to liberate bromine therefrom, vaporizing the so liberated bromine and returning the vapors to the condensing step.

3. The continuous process of extracting bromine from sea water and the like which comprises acidifying the same, treating with chlorine to liberate bromine therein, blowing out the bromine with a current of air, removing bromine from such air current by contact with a body of adsorbent material and heating such adsorbent to separate bromine therefrom.

4. The continuous process of extracting bromine from sea water and the like which comprises acidifying the same, treating with chlorine to liberate bromine therein, blowing out the bromine with a current of air, removing bromine from such air current by contact with a body of active charcoal, heating such charcoal with steam to vaporize bromine therefrom, condensing the vapors and separating liquid bromine from the aqueous distillate.

5. The continuous process of extracting bromine from sea water and the like which comprises acidifying the same, treating with chlorine to liberate bromine therein, blowing out the bromine with a current of air, removing bromine from such air current by contact with a body of active charcoal, heating such charcoal with steam to vaporize bromine therefrom, condensing the vapors, separating liquid bromine from the aqueous distillate containing hydrobromic acid, treating the latter with chlorine to liberate bromine therefrom, d stilling off such bromine with steam, returning the vapors to the condensing step and employing the residual aqueous hydrochloric acid solution for acidifying more raw sea water.

6. The continuous process of extracting bromine from sea water and the like which comprises acidifying the same, oxidizing to liberate bromine in the elemental state, blowing out the bromine with a current of air, removing bromine from such air current by contact with a body of adsorbent material and heating such adsorbent to recover bromine therefrom.

7. The continuous process of extracting bromine from sea water and the like which comprises acidifying the same, oxidizing to liberate bromine in the elemental state, blowing out the bromine with a current of air, removing bromine from such air current by contact with a body of active charcoal, heating such charcoal with steam to vaporize bromine therefrom, condensing the vapors and separating liquid bromine from the aqueous distillate.

8. The continuous process of extracting bromine from sea water and the like which comprises acidifying the same, oxidizing to liberate bromine in the elemental state, blowing out the bromine with a current of air, removing bromine from such air current by contact with a body of active charcoal, heating such charcoal with steam to vaporize bromine therefrom, condensing the vapors, separating liquid bromine from the aqueous distillate containing hydrobromic acid, treating the latter with chlorine to liberate bromine therefrom, distilling off such bromine with steam, returning the vapors to the condensing step and employing the residual aqueous hydrochloric acid solution for acidifying more raw sea water.

9. The process of recovering bromine which comprises contacting a current of bromine-laden air with a body of an adsorbent material of the class consisting of active carbon, active charcoal, and a metallic oxide gel, heating the bromine-charged adsorbent material with steam to distill the bromine therefrom, condensing the vapors of water and bromine and separating liquid bromine from the aqueous solution thereby obtained.

10. The continuous process of extracting bromine from sea water and the like which comprises acidifying the same, treating with chlorine to liberate bromine therein, blowing out the bromine with a current of air, removing bromine from such air current by contact with a body of active charcoal, recycling the debrominated air to said blowing-out step, heating the bromine-charged charcoal with steam to vaporize bromine therefrom, condensing the vapors, separating liquid bromine from the aqueous distillate containing hydrobromic acid, treating the latter with chlorine to liberate bromine therefrom, distilling off such bromine with steam, returning the vapors to the condensing step and employing the residual aqueous hydrochloric acid solution for acidifying more raw sea water.

11. In a process of recovering bromine, the steps which consist in contacting a current of bromine-laden air with a body of adsorbent material to remove bromine therefrom by adsorption on such material, then heating such bromine-charged material to vaporize bromine therefrom and condensing the vapors.

12. In a process of recovering bromine, the steps which consist in contacting a current of bromine-laden air with a body of active charcoal to remove the bromine therefrom by adsorption on such charcoal, then heating such bromine-charged charcoal to vaporize bromine therefrom and condensing the vapors.

Signed by us this 30 day of June, 1930.
JOHN J. GREBE.
RAY H. BOUNDY.

CERTIFICATE OF CORRECTION.

Patent No. 1,885,255.    November 1, 1932.

JOHN J. GREBE ET AL.

It is hereby certified that error appears in the printed specification of the above numbered patent requiring correction as follows: Page 1, line 8, for "said" read "such"; page 3, line 13, for "essential" read "elemental"; and that the said Letters Patent should be read with these corrections therein that the same may conform to the record of the case in the Patent Office.

Signed and sealed this 10th day of January, A. D. 1933.

(Seal)
M. J. Moore,
Acting Commissioner of Patents.

which comprises contacting a current of bromine-laden air with a body of an adsorbent material of the class consisting of active carbon, active charcoal, and a metallic oxide gel, heating the bromine-charged adsorbent material with steam to distill the bromine therefrom, condensing the vapors of water and bromine and separating liquid bromine from the aqueous solution thereby obtained.

10. The continuous process of extracting bromine from sea water and the like which comprises acidifying the same, treating with chlorine to liberate bromine therein, blowing out the bromine with a current of air, removing bromine from such air current by contact with a body of active charcoal, recycling the debrominated air to said blowing-out step, heating the bromine-charged charcoal with steam to vaporize bromine therefrom, condensing the vapors, separating liquid bromine from the aqueous distillate containing hydrobromic acid, treating the latter with chlorine to liberate bromine therefrom, distilling off such bromine with steam, returning the vapors to the condensing step and employing the residual aqueous hydrochloric acid solution for acidifying more raw sea water.

11. In a process of recovering bromine, the steps which consist in contacting a current of bromine-laden air with a body of adsorbent material to remove bromine therefrom by adsorption on such material, then heating such bromine-charged material to vaporize bromine therefrom and condensing the vapors.

12. In a process of recovering bromine, the steps which consist in contacting a current of bromine-laden air with a body of active charcoal to remove the bromine therefrom by adsorption on such charcoal, then heating such bromine-charged charcoal to vaporize bromine therefrom and condensing the vapors.

Signed by us this 30 day of June, 1930.
JOHN J. GREBE.
RAY H. BOUNDY.

CERTIFICATE OF CORRECTION.

Patent No. 1,885,255.   November 1, 1932.

JOHN J. GREBE ET AL.

It is hereby certified that error appears in the printed specification of the above numbered patent requiring correction as follows: Page 1, line 8, for "said" read "such"; page 3, line 13, for "essential" read "elemental"; and that the said Letters Patent should be read with these corrections therein that the same may conform to the record of the case in the Patent Office.

Signed and sealed this 10th day of January, A. D. 1933.

M. J. Moore,
Acting Commissioner of Patents.

(Seal)

CERTIFICATE OF CORRECTION.

Patent No. 1,885,255.　　　　　　　　　　　　　　　　November 1, 1932.

JOHN J. GREBE ET AL.

It is hereby certified that error appears in the printed specification of the above numbered patent requiring correction as follows: Page 1, line 8, for "said" read "such"; page 3, line 13, for "essential" read "elemental"; and that the said Letters Patent should be read with these corrections therein that the same may conform to the record of the case in the Patent Office.

Signed and sealed this 10th day of January, A. D. 1933.

(Seal)　　　　　　　　　　　　　　　　　　　　　　M. J. Moore,
　　　　　　　　　　　　　　　　　　　　　Acting Commissioner of Patents.